Figure 1:
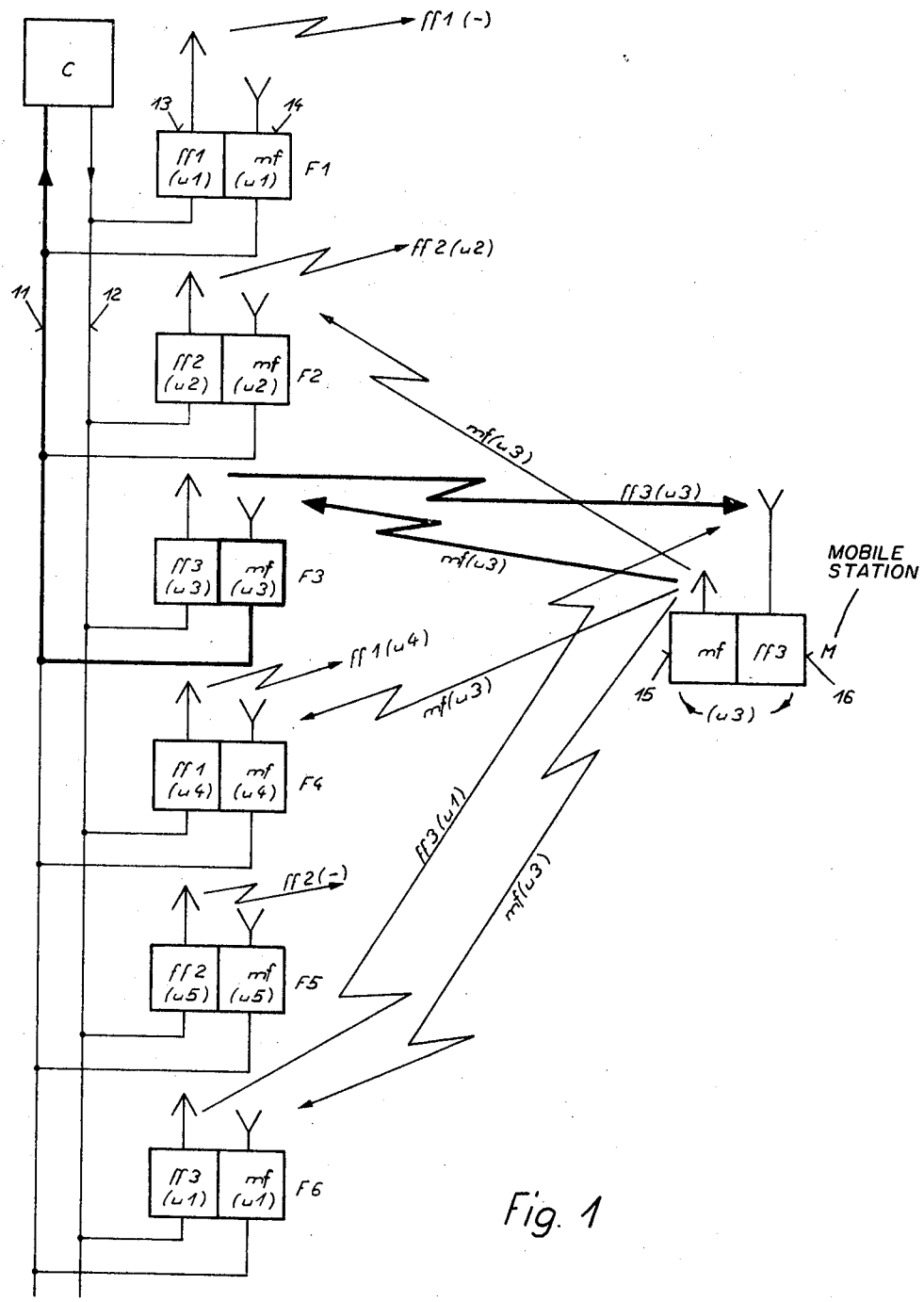

United States Patent [19]
Zimmermann et al.

[11] 4,092,600
[45] May 30, 1978

[54] INSTALLATION FOR TWO-WAY RADIO COMMUNICATION

[75] Inventors: Alois Zimmermann, Langendorf; Hansruedi Müller, Solothurn, both of Switzerland

[73] Assignee: Autophon Aktiengesellschaft, Solothurn, Switzerland

[21] Appl. No.: 713,496

[22] Filed: Aug. 11, 1976

[30] Foreign Application Priority Data

Aug. 27, 1975 Switzerland .................. 11095/75

[51] Int. Cl.² .............................................. H04B 1/00
[52] U.S. Cl. .................................... 325/55; 325/53; 325/3; 343/180; 179/41 A
[58] Field of Search ............... 325/51, 53, 55, 59, 325/54, 56, 3–5, 28, 29; 179/41 A; 343/176, 177, 179, 180

[56] References Cited

U.S. PATENT DOCUMENTS

| | | |
|---|---|---|
| 2,642,524 | 6/1953 | Bayliss ................................ 325/53 |
| 2,883,522 | 4/1959 | Brosh .................................. 325/5 |
| 3,189,822 | 6/1965 | Morita et al. ...................... 325/56 |
| 3,662,267 | 5/1972 | Reed ................................... 325/53 |
| 3,818,345 | 6/1974 | Miya et al. ......................... 325/53 |
| 3,906,166 | 9/1975 | Cooper et al. ..................... 325/55 |
| 3,913,017 | 10/1974 | Imaseki ............................. 179/41 A |
| 3,955,140 | 5/1976 | Stephens et al. ................... 325/55 |

Primary Examiner—Robert L. Griffin
Assistant Examiner—Tommy P. Chin
Attorney, Agent, or Firm—Roland Plottel

[57] ABSTRACT

Two-way radio communication system with several fixed stations serviced by a fixed dispatching center and with at least one mobile station. The fixed stations transmit at different frequencies and the mobile station at one frequency. The mobile station contains means for hunting the frequency with the best reception and thus receives only the fixed station having the best possible transmission conditions. All stations contain means ensuring that the dispatching center is connected only to the receiver of the fixed station, the transmitter of which is received by the mobile station.

3 Claims, 4 Drawing Figures

INSTALLATION FOR TWO-WAY RADIO COMMUNICATION

This invention relates to an improved installation for two-way radio communication between a fixed dispatching center and at least one mobile station moving within a specific area which is beyond the service range of a single fixed transmitting and receiving station. In known installations of this type, fixed stations are situated at various locations within the aforementioned area, and information directed to the mobile station from the dispatching center is transmitted simultaneously over each of the transmitters contained in these fixed stations at differing frequencies assigned to the respective fixed stations.

This information is received at the mobile station by a single receiver which is always switched over to whichever of the different frequencies offers the best reception by circuitry designed to check the received field strength at each frequency and to control the incoming frequency. The mobile station transmits information intended for the dispatching center at a single, unchanging frquency received by the various fixed stations.

Installations of this kind ensure that the best possible transmission conditions always prevail for traffic from the dispatching center to the mobile station wherever it may be situated. For transmission in the opposite direction, similar results could also be achieved if the receiving results of the various receivers situated at the fixed stations were compared to determine which receiver provides the best communication and only the receiver giving the best result was connected to the dispatching center. Such a system of which a summary is given in the U.S. Pat. No. 3,906,166, column 2, lines 35 to 47, is very complicated and would be very expensive in a system having fixed stations along a railroad or a turnpike.

It is an object of this invention to provide an improved system of the first mentioned type which is, concerning the direction of transmission from the mobile station to the dispatching center, very much simpler but gives the same good results as the last mentioned system.

It is a further object of this invention to provide such an installation in which the connection between the output of a fixed receiver and the dispatching center is effected only in that particular fixed station whose transmitter is received by the receiver of the mobile station.

To this end, the improvement according to the present invention comprises the allocation to each fixed station of an additional assigned frequency outside the speech band for identifying the respective fixed station, first circuit means disposed in the mobile station for modulating the identifying signal corresponding to the last-received fixed station upon the transmitter of the mobile station, and second circuit means disposed in each fixed station for connecting the receiver output thereof with the dispatching center only when the frequency of the received identifying signal corresponds to the additional assigned frequency identifying the respective fixed station, whereby only the receiver output of the particular fixed station whose transmitter is received at the mobile station is connected to the dispatching center.

Figure 2:
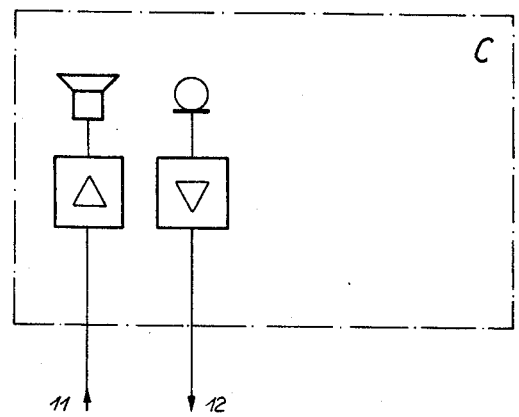
Figure 3:
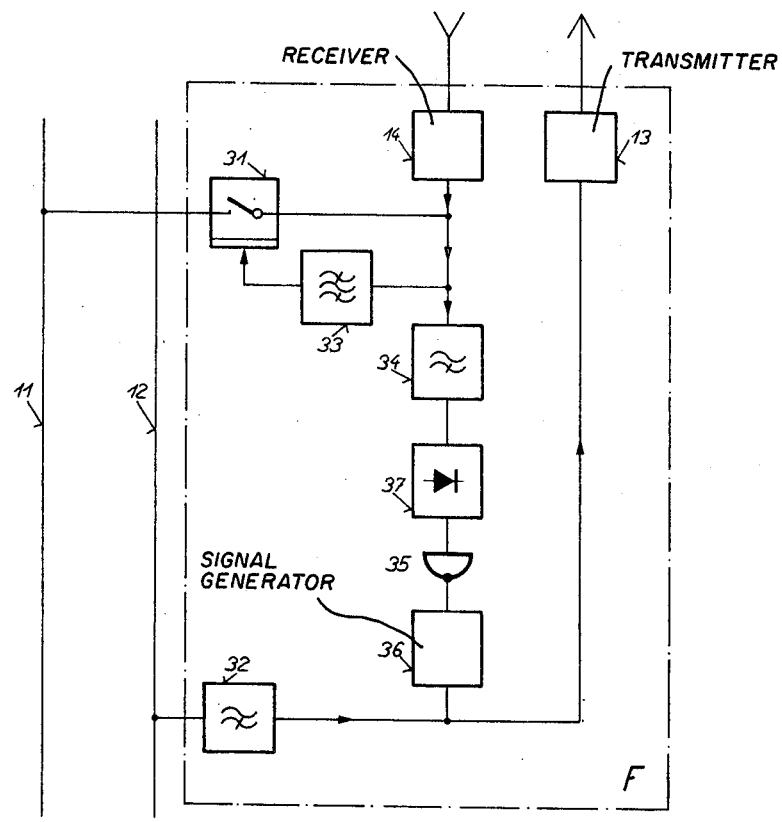
Figure 4:
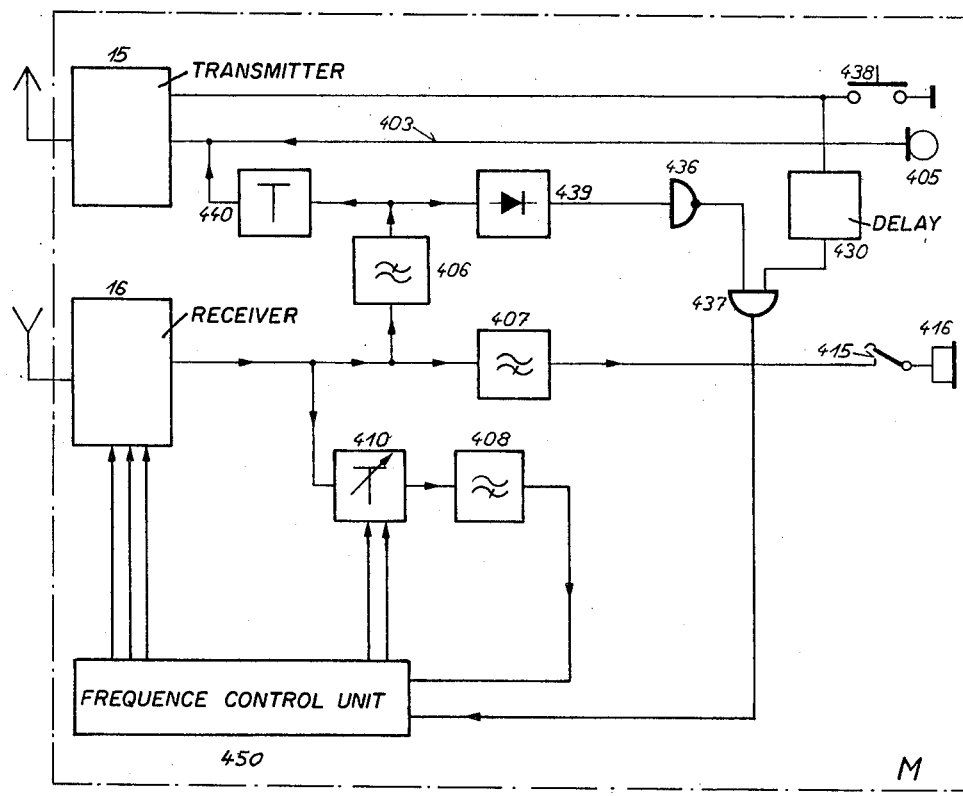

A preferred embodiment of the invention will now be described in detail with reference to the accompanying drawings, in which:

FIG. 1 is a block diagram of part of an installation for establishing radio communication between a fixed dispatching center and a mobile station which is contained, for example, in a train travelling over a long railroad line, FIG. 2 is a simplified circuit diagram of the dispatching center, FIG. 3 is a simplified circuit diagram of one of the fixed stations, and FIG. 4 is a simplified circuit diagram of the mobile station.

FIG. 1 shows a fixed dispatching center C connected via two lines 11 and 12, one for each direction of transmission, to six fixed stations F1–F6. It would naturally also be possible to replace wire lines 11 and 12 by wireless links. Each of the fixed stations F1–F6 comprises a transmitter 13 and a receiver 14 with respective antennas. A mobile station M comprises a transmitter 15 and a receiver 16, each with a respective antenna.

Each of the fixed stations F1–F6 is assigned to one of three transmitting frequencies $ff1$–$ff3$ and one of five additional frequencies $u1$–$u5$ of an identifying signal. The receiving frequency is always $mf$. Mobile station M transmits at frequency $mf$, and its receiver 16 can be tuned to frequencies $ff1$–$ff3$. In FIG. 1, receiver 16 is assumed to be tuned to frequency $ff3$. The aforementioned identifying signal may be superposed by a fixed station at a subaudio frequency on the speech modulated upon the transmitter, and at a fixed station the reception of an identifying signal of the frequency assigned to that station produces certain effects there.

The transmitting frequencies of the fixed stations are conventionally distributed among the various transmitters in such a way that signals emanating from two fixed stations transmitting at the same frequency do not predominate over all signals from other stations at any of the possible locations of mobile station M. A larger number of differing frequencies are preferably used for the identifying signals than for these transmitting frequencies. The frequencies of these identifying signals are then distributed among the fixed stations in such a way that a certain mobile station situated at any given location can never be received simultaneously at more than one fixed station having the same identifying signal frequency.

Basically, the installation operates in such a way that the transmitters of all fixed stations transmit continuously, whereas transmitter 15 of mobile station M transmits only when a conversation is supposed to take place. In the stand-by state of the installation, an identifying signal is not modulated upon any of the transmitters of the fixed stations.

FIG. 2 shows dispatching center C, comprising a microphone and a loudspeaker with respective amplifiers. Lines 11 and 12, for which wireless links may also be used, lead to the fixed stations.

The fixed station illustrated in FIG. 3 contains a transmitter 13 and a receiver 14. The receiver output may be connected to line 11 via an electronic switch 31, and the transmitter input is connected to line 12 via a high-pass filter 32. Electronic switch 31 is made conductive when the output signal of receiver 14 contains an identifying signal which is passed through a band-pass filter 33. A high-pass filter 34 leads noise components contained in the receiver output to the rectifier 37 which puts out a d.c. signal. The inverter 35 thus puts out a signal if the magnitude of the noise components is below a certain level. It is well known that this is only the case when the receiver 14 receives a signal. The output signal of the inverter 35 controls a generator 36 which generates, if triggered by said output signal, an identifying signal whose frequency is below the voice frequency band. This identifying signal, thus only generated if the receiver receives a signal, is supplied to the input of transmitter 13 together with the speech signal from line 12. High-pass filter 32, which passes the speech signal, prevents the identifying signal from flowing off to line 12. In all fixed stations, identifying signal generator 36 and band-pass filter 33 are tuned to the same frequency assigned to the respective stations.

Mobile station M illustrated in FIG. 4 contains transmitter 15 and receiver 16, each with its respective antenna. Transmitter 15 comprises a keying input, controlled by a push button 438, and a modulation input 403 to which the signal of a microphone 405 is supplied. Receiver 16 comprises three control inputs controlled by a frequency control unit 450 over which the receiving frequency can be set to one of three values. The output of receiver 16 is connected to a low-pass filter 406 which passes only the identifying signal, to a high-pass filter 407 which blocks the identifying signal, and to a three-stage fader 410. This fader is controlled over two inputs by the frequency control unit 450. The three stages are put in active condition by giving signals on no, on one, or on both inputs. The identifying signal which has passed the low-pass filter 406 is both supplied to modulation input 403 via a fader 440 together with the speech signal and rectified in a diode stage 439 for use in a logical control in a manner to be described below. The speech signal passed by high-pass filter 407 reaches an earphone 416 via a cradle switch 415. The output of fader 410 is connected to a high-pass filter 408 which blocks both the speech signal and the identifying signal. The signal at the output of the high-pass filter 408 depends on the noise contained in the receiver output and on the stage of the fader being put in active condition by the frequency control unit 450. This signal is led to the input of this unit.

As it is well known that the magnitude of the noise on the output of a receiver is inverse to the strength of the received signal, the frequency control unit can decide if a signal received by the receiver 16 is beyond or below a central level. This unit also is able to adjust this level to three stages by giving respective signals to the fader 410. The highest level for testing the magnitude of reception is achieved when the fader is on the stage with the lowest attenuation. If during the reception of a certain frequency, controlled by the frequency control unit 450, the noise on the input of said unit exceeds said certain level, the unit causes, by controlling the receiver 16 to change in turn the receiving frequencies, a hunt to find another receiving frequency with less noise. In a manner not shown, fader 410 is first controlled to a low attenuation in order to hunt a frequency on which is a very good reception. The hunting is stopped when such a frequency is found. Only when no fixed station which can be very well received, is found, the hunt is repeated while the fader 410 is set to a higher attenuation. In that manner, the best possible communication frequency for the actual position of the mobile station is selected.

The logical control to which the output signal of diode stage 439 is supplied comprises an AND-gate 437, an inverter 436, and a delay element 430; it operates in such a way that it generates a signal only when push button 438 activates transmitter 15 for a period of time at least equivalent to the make-time of delay element 430 and while no identifying signal is arriving from receiver 16 via low-pass filter 406.

Thus the facilities diagrammed in FIG. 4 continuously ensure the best possible quality of transmission in the direction of traffic from dispatching center C to mobile station M. With reference to FIGS. 1, 3, and 4, steps and circuitry will now be described which serve to connect the loudspeaker of dispatching center C only with the receiver output in that particular fixed station whose transmitter is received by mobile station M. This is basically achieved in that different identifying frequencies are assigned to fixed stations F1–F6, that mobile station M modulates upon its transmission signal the identifying frequency of that fixed station whose transmitter it receives, and that in the fixed stations an incoming signal is routed to dispatching center C only when the identifying signal received agrees with the identifying signal assigned to the respective fixed station. The identifying signals are generated by identifying signal generators 36 in fixed stations F1–F6; the frequency of each is the frequency assigned to the respective fixed station. The identifying signal is modulated upon the carrier only by those fixed stations at which mobile station M is received. The identifying signal of that fixed station which is received by receiver 16 of mobile station M is then transmitted in turn by mobile station M, received at various fixed stations, and applied there to the inputs of band-pass filters 33. Since, as already stated, each of the band-pass filters 33 is tuned to the same frequency as the identifying signal generator 36 contained in the same station, the frequency of the identifying signal agrees with the pass frequency of filter 33 only in that particular fixed station which is received by mobile station M, so that only there is the electronic switch 31 actuated. Consequently, only in that particular fixed station which is received by mobile station M does the output signal of the respective receiver 14 reach dispatching center C, so that the loudspeaker of dispatching center C is connected to only one single receiver output.

Thus by means of the selection by mobile station M of the best received fixed station, as described above, the fixed station over which traffic takes place in the opposite direction is also selected. Hence identical transmission conditions are achieved in both directions.

If the carrier of a fixed station, but no identifying signal, is received at mobile station M, even though its transmitter is keyed, this may mean that the receiver of the fixed station received by mobile station M is out of order and that identifying signal generator 36 of that station has not been turned on. In order to prevent mobile station M from not being heard at dispatching center C in this case, the logical circuit in mobile station M, comprising inverter 436 and gate 437, generates an output signal which produces the same effect in frequency control unit 450 as noise at the receiver output, thus causing a hunt for a receiving channel upon which an identifying signal is modulated.

The system described will now be recapitulated with reference to FIG. 1. There are six fixed stations F1 to F6 which transmit, at a total of three frequencies $ff1$ to $ff3$, the speech and data signals emanating from fixed dispatching center C. The frequencies are allocated to the fixed stations according to a cyclical permutation. The identifying signal generators and the corresponding filters in the fixed stations are tuned to the five different frequencies u1 to u5, shown in parentheses for the respective transmitters and receivers. For the outgoing signals, the frequency of the identifying signal contained in the modulation signal is likewise shown in parentheses next to the frequency of the carrier (ff1, ff2, ff3, mf); with a minus sign in parentheses (−) indicating that no identifying signal is modulated. Receiver 16 of mobile station M is receiving at frequency ff3. Therefore, of the fixed stations depicted, it can receive stations F3 and F6. It shall now be assumed that the signals of station F3 can be received at a substantially greater field strength than those of station F6, so that the signals from the latter station are suppressed and cause no disturbance. Insofar as the fixed stations are suitably disposed, and insofar as the most favorable possibility of reception is hunted for at mobile station M in the manner described, the aforementioned assumptions hold true in all cases. It is further assumed that the transmission signal of mobile station M, transmitted at frequency mf, is received at fixed stations F2, F3, F4, and F6. All these stations modulate their assigned identifying signal upon their transmission signal.

Except for the one transmitted by station F3, the transmission signals are not received at mobile station M, so that the identifying signals modulated upon them do not have any significance for mobile station M either. The identifying signal at frequency u3 modulated upon the transmitter of fixed station F3, on the other hand, is modulated upon the transmission signal of mobile station M. This transmission signal is then received at the mentioned stations F2, F3, F4, and F6. Of these stations, however, only station F3 has a filter tuned to frequency u3, so that only at this station is the receiver output connected to line 11. Thus traffic between dispatching center C and mobile station M is handled in both directions solely via fixed station F3 inasmuch as it has been determined at mobile station M that in its present location, at least approximately the best transmission conditions can be achieved in that way.

As already stated, fixed stations F1–F6 transmit continuously, whereas mobile station M transmits only when carrying on a conversation with dispatching center C. The frequency selection unit in mobile station M operates regardless of whether transmitter 15 is keyed or not, and thus it always keeps the most favorable connection in readiness for incoming and for outgoing calls. If there should be more than one mobile station, only one of them transmits at a time, so that what has been stated above with reference to just one mobile station also applies unreservedly in that case as well.

The invention is in no way confined to the embodiment described above by way of example. In particular, the number of frequencies used for the transmission and identifying signals and the number of thresholds for measuring the receiving levels have been chosen purely arbitrarily in the example described.

The signalling of the connected station might also take place by means of identifying signals superposed on the modulation signal at a superaudio frequency instead of a subaudio frequency, by means of another type of modulation, or by means of short, periodic AF signals in the speech range. Nor is it necessary—provided certain advantages are dispensed with—to generate the identifying signal in the fixed station. It would also be conceivable to assign an identifying signal to each carrier frequency, to generate that signal in the mobile station, and to make its frequency dependent upon the chosen receiving frequency.

In another alternative to the example described, the detection of a carrier and the determination of the level thereof might be achieved, for instance, in a direct manner known per se.

In the embodiments described, it has been assumed that in both the fixed and the mobile stations, the receivers can receive during operation of the associated transmitters. This calls for the provision of antenna combining filters not shown in the drawings. However, the invention is not limited to such arrangements. It is also applicable in installations in which transmitting and receiving can take place only alternately at the mobile stations. Under these conditions, a memory must be provided in each of the mobile stations for storing the identification of the last fixed transmitter received, and the identifying signal transmitted must be generated in the respective mobile station on the basis of the memory contents. In order to keep the transmission conditions from degrading when, during an uninterrupted communication, the mobile station moves out of the range of one fixed station and into the range of another, it would be advisable to provide circuitry for periodically switching the mobile station over from transmission to reception for short periods in such cases, whereby the receiving conditions could be checked each time and the generated identifying signal changed if necessary.

What is claimed is:

1. In an installation for two-way radio communication between a fixed dispatching center and at least one mobile station moving within a specific area beyond the service range of a single fixed transmitting and receiving station, of the type wherein information directed to said mobile station from said dispatching center is simultaneously transmitted over a plurality of transmitters in respective fixed stations disposed at various locations within said area at differing frequencies respectively assigned to each of said fixed stations, wherein said information is received at said mobile station by a single receiver capable of being switched to whichever of said differing frequencies offers the most favorable reception by circuitry for checking the received field strength at each of said frequencies and for controlling the incoming frequency, and wherein information directed to said dispatching center by said mobile station is transmitted at a single frequency receivable by said fixed stations, the improvement comprising:

allocation to each said fixed station of a signalling frequency outside the voice frequency band for identifying the respective said fixed station, first circuit means disposed in said mobile station for modulating the identifying signal corresponding to the last-received said fixed station upon the transmitter of said mobile station, and second circuit means disposed in each said fixed station for connecting the receiver output thereof with said dispatching center only when the frequency of the received identifying signal corresponds to the signalling frequency identifying the respective said fixed station, whereby only the said receiver output of the particular said fixed station whose said transmitter output signal is received at said mobile station is connected to said dispatching center.

2. The installation of claim 1, wherein each said fixed station comprises a generator for generating said signalling frequency allocated to the respective said fixed station, the output signal of said generator being modulated upon the associated said transmitter, and wherein said first circuit means comprises a filter disposed in each said mobile station between the receiver output and the transmitter input thereof, said filter being nonpassing for said information but passing for said identifying signals and enabling modulation upon said mobile station transmitter of said identifying signal received by the receiver of said mobile station.

3. The installation of claim 2, wherein each said fixed station further comprises third circuit means for influencing the supplying of said identifying signal to the modulation input of the respective said fixed station transmitter, said circuit means allowing modulation of said identifying signal upon said fixed station transmitter only as long as the receiver of said fixed station is receiving said mobile station, and wherein said mobile station further comprises fourth circuit means associated with said mobile station receiver for monitoring each signal received by said receiver as to the presence of one of said identifying signals contained therein and, insofar as the associated said transmitter is in operation, for simulating lack of reception upon lack of one of said identifying signals, thereby causing said receiver to receive another one of said transmitters which is in a said fixed station and whose transmission signal contains one of said identifying signals.

* * * * *